United States Patent
Bot et al.

(10) Patent No.: US 11,161,612 B2
(45) Date of Patent: Nov. 2, 2021

(54) SYSTEM FOR BRACING A TENSILE ELEMENT IN A VEHICLE

(71) Applicant: Airbus Operations GmbH, Hamburg (DE)

(72) Inventors: Sebastien Bot, Hamburg (DE); Valentin Graveline, Hamburg (DE); Marco Argento, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 259 days.

(21) Appl. No.: 16/388,559

(22) Filed: Apr. 18, 2019

(65) Prior Publication Data
US 2019/0329888 A1    Oct. 31, 2019

(30) Foreign Application Priority Data

Apr. 30, 2018   (DE) .......................... 102018110379.4

(51) Int. Cl.
*B64D 11/00* (2006.01)

(52) U.S. Cl.
CPC ................................. *B64D 11/003* (2013.01)

(58) Field of Classification Search
CPC .............. B64D 11/003; B64D 11/0627; B64D 11/0636; F16G 11/12; F16G 11/146; F16B 21/12; F16M 11/10; B60R 7/10; A47B 21/0314
See application file for complete search history.

(56) References Cited

U.S. PATENT DOCUMENTS

| | | | | |
|---|---|---|---|---|
| 2,540,887 A | * | 2/1951 | Hyatt | B64F 1/12 24/68 R |
| 2,930,288 A | * | 3/1960 | Jonah | B64D 1/04 89/1.817 |
| 3,174,790 A | * | 3/1965 | Bendl | B66C 1/34 294/82.3 |
| 5,938,149 A | | 8/1999 | Terwesten | |
| 6,318,671 B1 | | 11/2001 | Schumacher et al. | |

(Continued)

FOREIGN PATENT DOCUMENTS

| | | |
|---|---|---|
| CN | 110406679 A | 11/2019 |
| DE | 19633469 C1 | 9/1997 |
| DE | 19839701 C2 | 7/2003 |

(Continued)

*Primary Examiner* — Richard R. Green
*Assistant Examiner* — William L Gmoser
(74) *Attorney, Agent, or Firm* — Jenkins, Wilson, Taylor & Hunt, P.A.

(57) ABSTRACT

A system for bracing a tensile element in a vehicle has an elongate tensile element having a traction eyelet, a structurally fixed holder, and a tensioning device. The tensioning device has an angled tensioning lever having first and second leg portions with a pivot bearing disposed therebetween. The fixed holder has a bearing which for coupling to the traction eyelet is displaceable along a first direction. The tensioning lever by way of the pivot bearing is coupled to the holder. The first leg portion is coupled to the bearing such that the bearing by pivoting the tensioning lever is displaced in the holder. The second leg portion has a tensioning means which by displacing the bearing sets a variable spacing between the second leg portion and a tensioning face that faces the second leg portion.

14 Claims, 5 Drawing Sheets

(56) References Cited

U.S. PATENT DOCUMENTS

2005/0207834 A1* 9/2005 Muller .................. F16L 23/036
                                                          403/288
2012/0145829 A1* 6/2012 Stierle .................. B64D 11/003
                                                          244/131

FOREIGN PATENT DOCUMENTS

| DE | 10 2009 029 120 A1 |   | 3/2011  |                |
|----|--------------------|---|---------|----------------|
| DE | 202010017053       | * | 4/2012  | ...... B66C 1/12 |
| EP | 2 660 142 A2       |   | 11/2013 |                |
| EP | 2 679 501 A2       |   | 1/2014  |                |

\* cited by examiner

SYSTEM FOR BRACING A TENSILE ELEMENT IN A VEHICLE

CROSS-REFERENCE TO PRIORITY APPLICATION

This application claims the benefit of, and priority to, German patent application number DE 102018110379.4, filed Apr. 30, 2018. The content of the referenced application is incorporated by reference herein.

TECHNICAL FIELD

Embodiments of the subject matter described herein relate generally to a system for bracing a tensile element in a vehicle. The subject matter further relates to a vehicle having a cabin, a plurality of installation elements which are in each case connected by way of at least one tensile element of this type to a structure of the vehicle being disposed therein.

BACKGROUND

In order for installation elements to be linked to vehicles, numerous different holders and devices which depend on the characteristics, the size, the weight and the installation position of the installation elements are used. While seats and other installations are often attached to fastening rails that are disposed on the floor, installation elements on a ceiling of a vehicle cabin can be fastened by way of truss-type frame constructions.

For example, patent publication DE 19839701 C2 shows a baggage storage assembly of this type. Patent publication DE 19633469 C1 shows a device for holding baggage storage units in aircraft cabins, in which cables and straps are inter alia used for holding.

In the case of these known installations it can be complex to equalize in particular component-related and production-related tolerances when linking the installation elements.

BRIEF SUMMARY

It is an object of the disclosure to propose a fastening system or the like which is capable of improving a usual braced system using tensioning cables in a vehicle, wherein the tensioning is in particular to be simplified and tolerances in terms of cable lengths are better capable of being equalized.

The object is achieved by a system for bracing a tensile element in a vehicle, having the features of independent claim 1. Advantageous embodiments and refinements are to be derived from the dependent claims and the description hereunder.

Proposed is a system for bracing a tensile element in a vehicle, the system having an elongate tensile element having a traction eyelet, a structurally fixed holder, and a tensioning device, wherein the tensioning device has an angled tensioning lever having a first leg portion and a second leg portion, a pivot bearing being disposed therebetween, wherein the structurally fixed holder has a bearing which for coupling to the traction eyelet is displaceable along a first direction, wherein the tensioning lever by way of the pivot bearing is coupled to the structurally fixed holder, wherein the first leg portion is coupled to the bearing in such a manner that the bearing by pivoting the tensioning lever is displaced in the structurally fixed holder, and wherein the second leg portion has a tensioning means which by displacing the bearing is configured for setting a variable spacing between the second leg portion and a tensioning face that faces the second leg portion.

The elongate tensile element having a traction eyelet is the element which is to be braced and which is used for absorbing tensile forces of an installation part in the vehicle. The tensile element can in particular have the traction eyelet at one end, while a traction eyelet can likewise be disposed at an opposite end, another installation however also being possible. Potential material compositions of the tensile element will be discussed further below. In general, all materials which have a high tensile strength would be expedient. This can relate to both metallic materials as well as plastics materials, also all types of fiber-reinforced plastics materials. The elongate embodiment of the tensile element means that the latter has a dominant axis of extent and a cross-sectional area which in comparison to the latter is very minor. The tensile element is furthermore configured for primarily absorbing tensile forces, while compressive and flexural forces lead to substantially only an elastic deformation movement of the tensile element.

The structurally fixed holder is provided for being connected to a primary structure of the respective vehicle. Alternatively thereto, said structurally fixed holder can also configure part of said primary structure. The structurally fixed holder consequently makes available a fastening base to which the tensile element is linked. On account of the bracing, a tensile force acting along the direction of extent of the tensile element acts on the structurally fixed holder at all times.

Finally, the tensioning device is a part of the system which can carry out the bracing of the tensile element in relation to the structurally fixed holder. The angled tensioning lever used to this end does not mandatorily have to be embodied as an angle lever, for example an L-shaped angle lever. Instead, a tensioning lever which is shaped in another arbitrary manner and in which the function of an angle lever can be implemented in geometrical terms could also be used. It is to be noted here that a straight line which intersects both the pivot bearing as well as the traction eyelet, and a straight line which runs along the second leg portion and intersects the pivot bearing, are not mutually parallel.

The displaceable bearing for coupling to the traction eyelet could be disposed in an elongate hole or in a linear bearing in the structurally fixed holder, for instance. It could be expedient for the displacement direction, that is to say the first direction, to be at least roughly congruent with the envisaged alignment of the tensile element. However, this can depend on the installation situation and the design in detail.

The actual position of the bearing is ultimately determined by the alignment of the first leg portion, since the first leg portion and the bearing are coupled to one another. This could be implemented, for instance, by a further elongate hole or similar in the first leg portion, the point of intersection of said further elongate hole with the first direction depending on the alignment of the first leg portion.

Meanwhile, the alignment of the first leg portion depends on the alignment of the second leg portion which by the tensioning means is guided at a variable spacing from a tensioning face. The tensioning means in a simple case can be an installation which is guided between the second leg portion and the tensioning face and therein causes a variable spacing. The tensioning means is preferably dimensioned in such a manner that tolerances to be expected in the length of the tensile element can be equalized and there is nevertheless a sufficient reserve in order to tension the tensile element therebeyond.

Depending on the embodiment of the tensioning lever, bracing of the tensile element can be carried out in a simple manner by way of the system according to the disclosure. The tensile element when slack can consequently first be attached to the bearing in the structurally fixed holder, so as to later carry out bracing directly in the proximity of the tensile element. Significant tolerances in the dimensions of a tensile element can also be equalized by way of the tensioning means.

One preferred embodiment has a spring-elastic element on the tensioning face, said spring-elastic element being configured for pushing the second leg portion in a direction that tensions the tensile element. The spring-elastic element allows the system according to the disclosure to additionally exert a slight tensile force on the tensile element in the event of vehicle movements which would lead to a slight deformation of the vehicle and thus to a momentary relaxation of the tensile element. The tensile element herein can be kept taut. In the installation of the tensile element in the case of a stationary vehicle, the spring-elastic element, by virtue of the tensioning means and the required bracing of the tensile element, is pushed to a compressed position and in particular onto the tensioning face or in the direction of the latter. The bracing of the tensile element in this moment can be achieved exclusively by way of the tensioning means. However, when the vehicle is confronted by dynamic loads said vehicle can be deformed in some locations so that the tensile element in certain cases is somewhat relaxed. The tensioning means in this instance is supported by the spring-elastic element which, by virtue of the absent pressure of the tensioning means, moves away from the tensioning face. The spring-elastic element can be dimensioned such that the tensile element in this case remains at least taut.

A further advantage in the use of the spring-elastic element lies moreover in that precise bracing of the tensile element is capable of being carried out independently of the tolerance in terms of length. The tensioning means in the installation can be set in such a manner that the tensile element is just no longer taut and the tensioning means just contacts the spring-elastic element, wherein the spring-elastic element is just not yet compressed. The additionally remaining distance which is predefined by the spring-elastic element and which remains up to the spring-elastic element being placed on the tensioning face, or up to the maximum compression of the spring-elastic element, respectively, serves for establishing the desired bracing of the tensile element. Said bracing in this instance is independent of the position or the setting, respectively, of the tensioning means. The tension achieved can consequently be determined by the dimensioning of the spring-elastic element.

The spring-elastic element can be embodied as a sheet-metal spring which has a resilient portion which faces away from the tensioning face and is capable of contacting the tensioning means in a planar manner. When bracing, said sheet-metal strip can then be deformed such that the latter bears on the tensioning face.

Alternatively thereto, a helical spring or a similar installation could also be used. Compressible elements which can be composed of an elastomer or another plastics material can likewise be used.

The tensioning face can be equipped with an optical marking, for instance a warning color, which is obscured in the event of the spring-elastic element being pushed onto the tensioning face. An observer when viewing the structurally fixed holder will immediately become aware that the tensioning device is not yet tensioned.

In one advantageous embodiment the tensioning lever is configured so as to be saddle-shaped and has two lateral faces which are mutually spaced apart and are connected to one another by a bridging portion. A symmetrical introduction of force can be performed between the tensioning lever and the structurally fixed holder on account of the saddle-shaped design. Said structurally fixed holder can be embodied so as to be relatively narrow and elongate such that the lateral faces of the tensioning lever enclose the structurally fixed holder.

In the case of this embodiment, two mutually parallel and opposite elongate holes can preferably be disposed in the lateral faces and guide the displaceable bearing. The elongate holes, for the symmetrical introduction of force, permit coupling to the displaceable bearing on both sides, and a mechanically simple embodiment of said coupling.

Alternatively thereto, two mutually parallel and opposite bores are disposed in the lateral faces and guide the displaceable bearing.

It goes without saying that only one elongate hole or one bore is required in the case of a design embodiment of the tensioning lever that is not saddle-shaped. Therefore, the tensioning lever can also have at least one elongate hole which is disposed in the first leg portion and guides the displaceable bearing. Alternatively thereto, the tensioning lever can also have at least one bore which is disposed in the first leg portion and guides the displaceable bearing.

The structurally fixed holder preferably has at least one elongate hole in which the bearing is disposed. The directions of extent of the elongate holes can be disposed beside one another both in the tensioning lever as well as in the structurally fixed holder, in particular in the case of the saddle-shaped design, such that points of intersection between the elongate holes result that at all times are dependent on the alignment of the tensioning lever. Said points of intersection determine the momentary position of the bearing.

The pivot bearing can extend through at least one pivot bearing bore of the tensioning lever and one bore of the structurally fixed holder. The bearing can extend through two mutually opposite pivot bearing bores in the lateral faces in particular in the case of the saddle-shaped embodiment of the tensioning lever mentioned above, said two mutually opposite pivot bearing bores therebetween enclosing a bore in the structurally fixed holder. The pivot bearing in this case can be implemented as a simple pin or bolt which is capable of being plug-fitted through the two or three, respectively, bores and is securable in the fully plug-fitted state. The securing can be performed by a safety pin, a nut, or similar.

The tensioning means can be implemented by a straining screw which is screwed into a thread of the tensioning lever. The tensioning means, that is the screw, preferably pushes onto the tensioning face by way of a screw end which is opposite to a screw head. On account thereof, a force which is sufficient to lead to the tensioning of the tensile element can be caused. However, the function on account thereof is not pre-defined so as to be rigid, because the tensioning lever in the event of vehicle movements could be pivoted in such a manner that the screw moves away from the tensioning face. Any overloading of the tensile element and the structurally fixed holder is pre-empted on account thereof. Meanwhile, a very good compensation of a tolerance in terms of length of the tensile element can be carried out by using a screw, because a large spacing range between the tensioning lever and the tensioning face can be covered by a choice in terms of the length of the screw.

The tensile element is particularly preferably equipped with reinforcement fibers which form a loop at the end in which the traction eyelet is integrated. An outstanding strength of the tensile element can be caused on account thereof, since the traction eyelet is completely integrated in the force flux of the reinforcement fibers. The traction eyelet can in particular be embodied as a sleeve which extends through the loop, or have such a sleeve.

The disclosure furthermore relates to a vehicle having a cabin and at least one installation element which is disposed therein and which by a system according to the disclosure is coupled to a structure fixed to the vehicle. An assembly of a plurality of installation elements can in particular be provided.

The vehicle in one particularly advantageous embodiment is an aircraft.

The at least one installation element is preferably a locker, in particular an overhead locker. Said overhead locker by way of a system according to the disclosure can be coupled at least on one side to the structure fixed to the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages, and potential applications of the disclosed subject matter are derived from the description hereunder of the exemplary embodiments and the figures. All of the features which are described and/or are illustrated pictorially form, individually and in any combination, form the subject matter of the disclosure also regardless of their inclusion in the individual claims or the dependency references thereof. Furthermore, in the figures, the same reference signs refer to identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
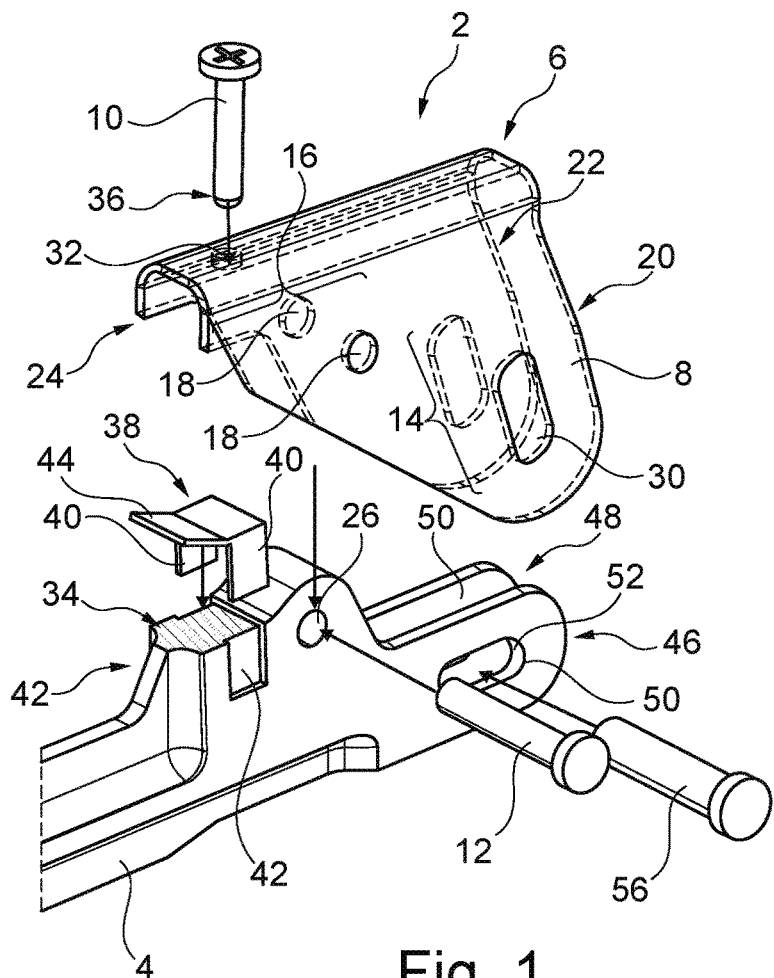
FIG. 1 shows a system according to an embodiment of the invention without a tensile element in an exploded illustration.

FIG. 1 shows the system 2 according to an embodiment of the invention in an exploded illustration. The system 2 has a structurally fixed holder 4 and a tensioning device 6 having an angled tensioning lever 8, a straining screw 10 as a tensioning means, and a bearing pin 12 for a pivot bearing. The tensioning lever 8 has a first leg portion 14 and a second leg portion 16, pivot bearing bores 18 being disposed therebetween.

The tensioning lever 8 in the illustration of FIG. 1 is configured so as to be saddle-shaped, and has a first lateral face 20 and a second lateral face 22 which in an exemplary manner run so as to be mutually parallel. Both lateral faces 20 and 22 are connected to one another by a bridging portion 24. Said bridging portion in the drawing plane has a reversed U-shaped profile cross section. The structurally fixed holder 4 can consequently be enclosed by the lateral faces 20 and 22 so that the pivot bearing bores 18 are mutually aligned with a bore 26 in the structurally fixed holder 4, and the bearing pin 12 is capable of being plug-fitted through all bores 18 and 26. On account thereof, a pivot bearing which in the further figures hereunder is provided with the reference sign 28 is created.

Two mutually opposite elongate holes 30 are disposed on the first leg portion 14, said elongate holes 30 running so as to be approximately orthogonal or transverse, respectively, to the bridging portion 24. A tensioning means bore 32 which has a thread and can receive the straining screw 10 is disposed on the bridging portion 24 in the region of the second leg portion 16. By rotating the straining screw 10, the relative position of the latter in relation to the bridging portion 24 can be set.

The structurally fixed holder 4 has a tensioning face 34 which in the case of an installed tensioning lever 8 is disposed below the straining screw 10. The region of the tensioning face 34 and the direct proximity thereof is supported by a screw end 36 such that a pivoting movement about the pivot bearing bores 18 is carried out by adjusting the relative position of the straining screw 10 in the bridging portion 24. If the straining screw 10 is screwed deeper into the tensioning means bore 32, the pivot lever 8 pivots further in the clockwise direction.

Additionally, a spring-elastic element 38 which by way of two mutually opposite lugs 40 is capable of being plug-fitted into clearances 42 of the structurally fixed holder 4 is present. A type of sheet-metal spring 44 in the form of a resilient portion which in the installed state of the spring-elastic element 38 projects from the tensioning face 34 is situated on the spring-elastic element 38. By pushing the sheet-metal spring 44 toward the tensioning face 34, the latter at all times exerts a counterforce on the screw end 36. The entire spring-elastic element in an exemplary manner can be configured as a sheet metal that has been formed multiple times.

A yoke assembly 48 which is composed of two mutually opposite lugs 50 is present on a free end 46 of the structurally fixed holder 4. Both lugs 50 are penetrated by an elongate hole 52 which in an exemplary manner extends along a direction of extent of the structurally fixed holder 4, or the lugs 50, respectively. A tensile element 54 can be incorporated in the yoke assembly 48 and can be secured by a pin 56 as a bearing.

It is to be noted here that the pin 56 is not plug-fitted exclusively through the two elongate holes 52 but additionally also through the two elongate holes 30 of the tensioning lever 8, the lateral faces 20 and 22 of said tensioning lever 8 surrounding the yoke assembly 48 in the installed state. Further explanations pertaining to the functional mode will follow in the context of further figures hereunder.

Figure 2:
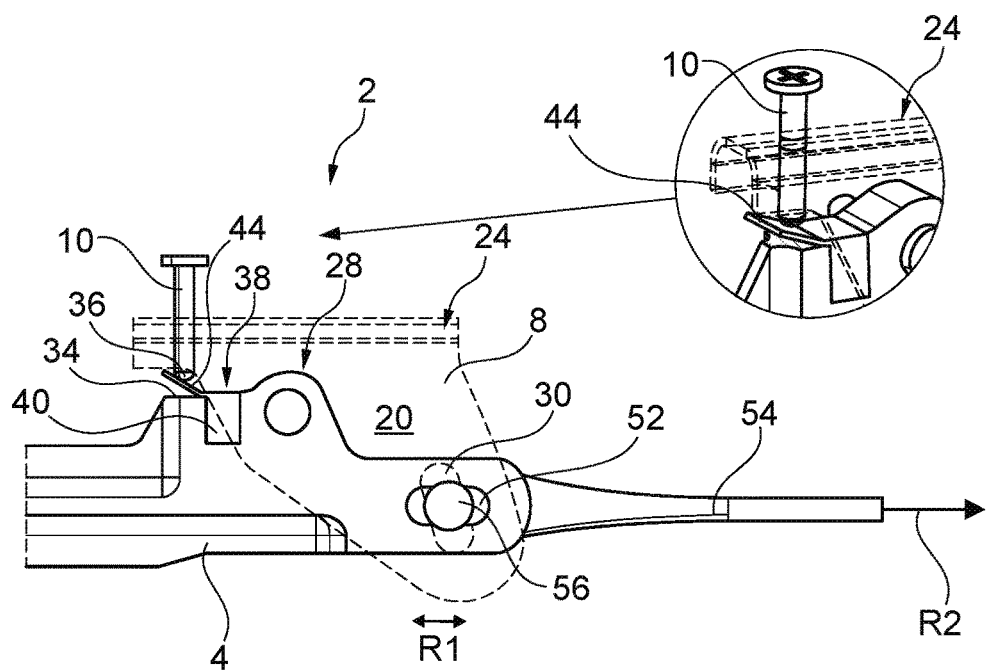
FIG. 2 shows the system according to an embodiment of the invention in an assembled state.

FIG. 2 shows the system 2 in the assembled state, having the tensile element 54 disposed thereon. It can be seen here that the pin 56 is displaceable in a direction R1. The displacement direction R1 herein corresponds to a direction of extent R2 of the tensile element 54 in which the tensile forces act on the tensile element 54 and thus on the pin 56. The actually assumed position of the pin 56 is determined by the elongate holes 30. Said elongate holes 30 are aligned so as to be oblique to the elongate holes 52, and when pivoting the pivot lever 8 about the pivot bearing 28 the pin 56 follows the interface between the elongate holes 52 and the elongate holes 30, depending on the pivot position of the pivot lever 8. When the pivot lever 8 rotates in the clockwise direction, the pin 56 and thus the tensile element 54 move to the left in the drawing plane, while when pivoting the pivot lever 8 in a counter clockwise manner the pin 56 is moved to the right in the drawing plane.

Meanwhile, the actual position of the tensioning lever 8 is determined by the screwed-in depth of the straining screw 10 since the screw end 36 in the design state of the tensioned tensile element 54 is at all times situated on the tensioning face 34 and thus directly influences the position of the tensioning lever 8. The sheet-metal spring 44 of the spring-elastic element 38 in the position shown is spaced apart from the tensioning face 34 and pushes onto the screw end 36. Only a slight bracing of the tensile element 54 is present in this situation. This case could arise when the vehicle in the event of a movement is subjected to a temporary deformation and the tensile element 54, on account thereof, is somewhat too long at this moment. The sheet-metal spring 44 in this instance causes the slight follow-on of the tensioning lever 8 so that the tensile element 54 is at least temporarily held taut. Further explanations pertaining to the fastening of the tensile element 54 and the bracing of the latter will be made further below.

Figure 3:
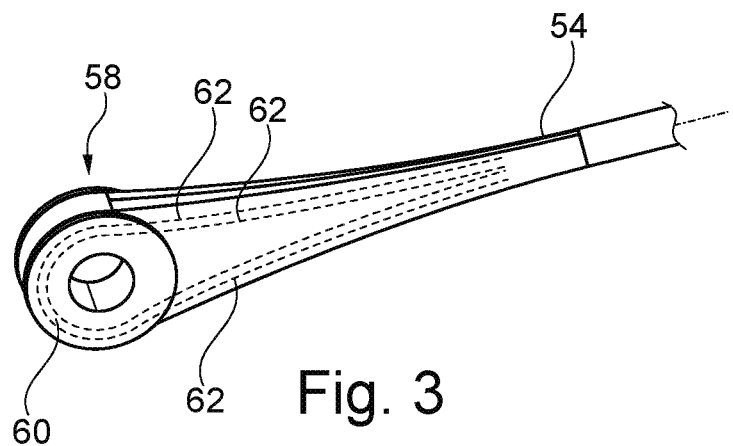
FIG. 3 shows one end of a tensile element.

FIG. 3 shows an end of the tensile element 54 on which a traction eyelet 58 in the form of a sleeve 60 is disposed. The tensile element 54 can have reinforcement fibers 62 which run around the sleeve 60 or the traction eyelet 58, respectively. This is illustrated by dashed lines in FIG. 3. A particularly high tensile strength for linking the sleeve 60 is obtained on account thereof.

Figure 4A:
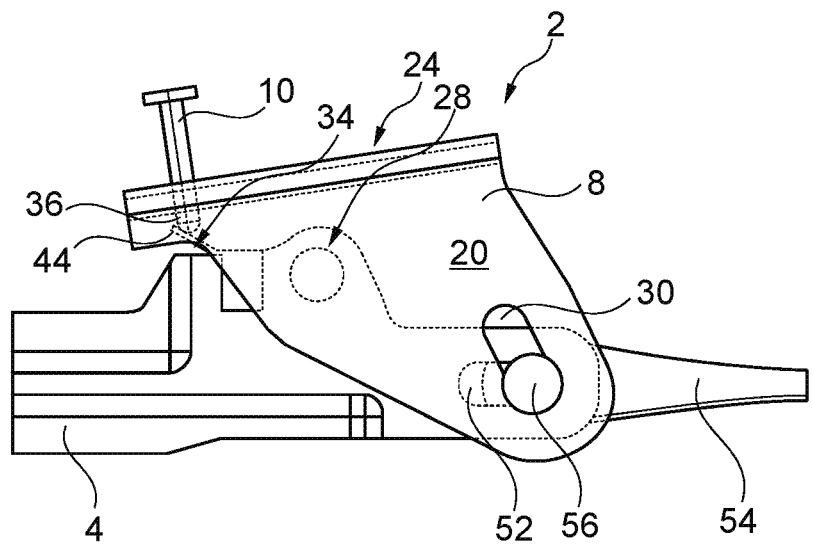
FIGS. 4a to 4c show the system according to an embodiment of the invention in successive steps when assembling.
Figure 4B:
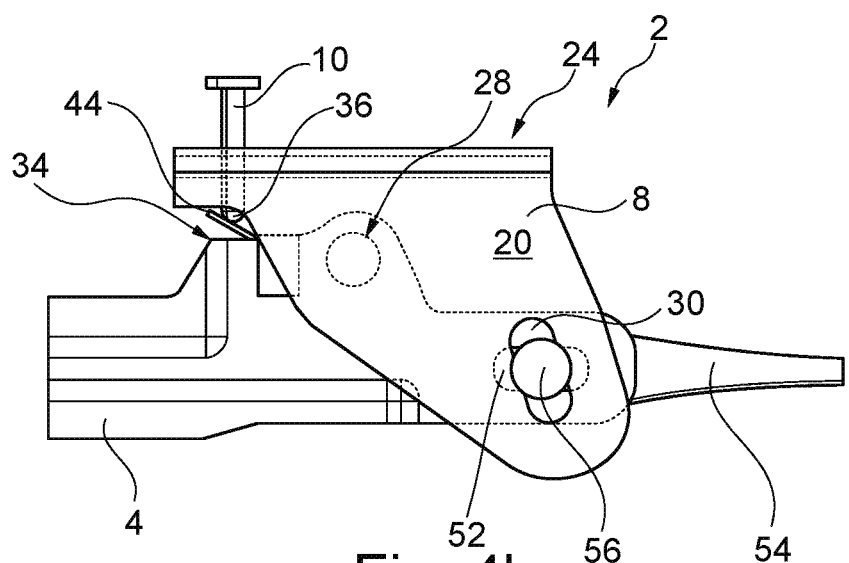
Figure 4C:
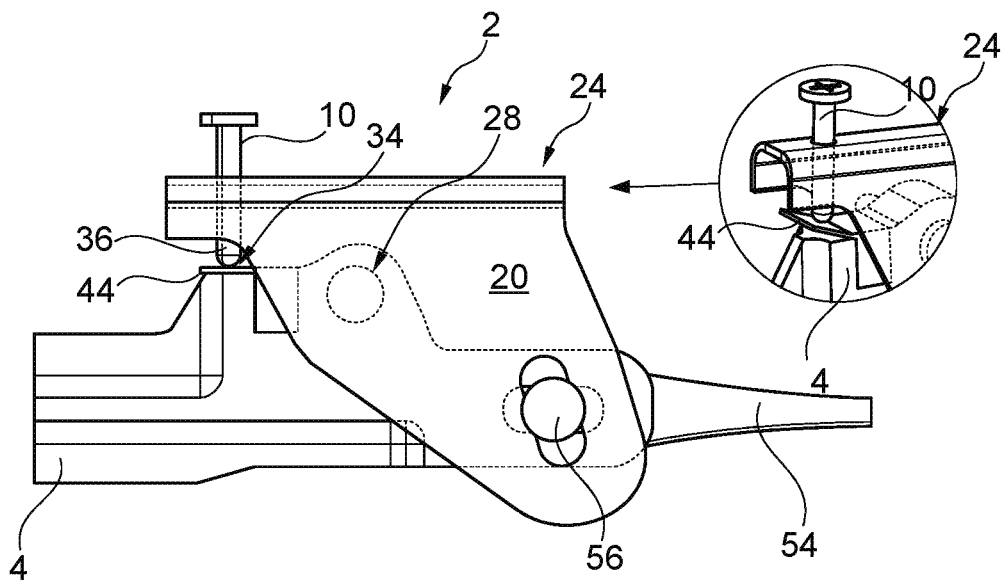

The installation of the system 2 is illustrated in FIGS. 4a to 4c. FIG. 4a first shows the installation of the tensile element 54 in the elongate holes 30 and 52 by way of the pin 56. The tensioning lever 8 is situated in a position which causes the slightest bracing of the tensile element 54. In other words, the pin 56 is in a relaxed position. The sheet-metal spring 44 is significantly spaced apart from the tensioning face 34.

The tolerances in terms of the length of the tensile element 54 are equalized in FIG. 4b. The straining screw 10 is screwed in just so far that the sheet-metal spring 44 is not yet flexed and the tensile element 54 just does not sag any more.

The straining screw 10 is subsequently screwed in so far that the screw end 36 pushes the sheet-metal spring 44 onto the tensioning face 34. On account thereof, a tensioning force which is sufficient for the desired function is exerted on the tensile element 54.

An optical marking or warning, respectively, for instance in the form of a red warning color, can be disposed on the tensioning face 34. When the sheet-metal spring 44 moves completely onto the tensioning face 34, an observer can directly identify that the system 2 is completely tensioned.

Figure 5:
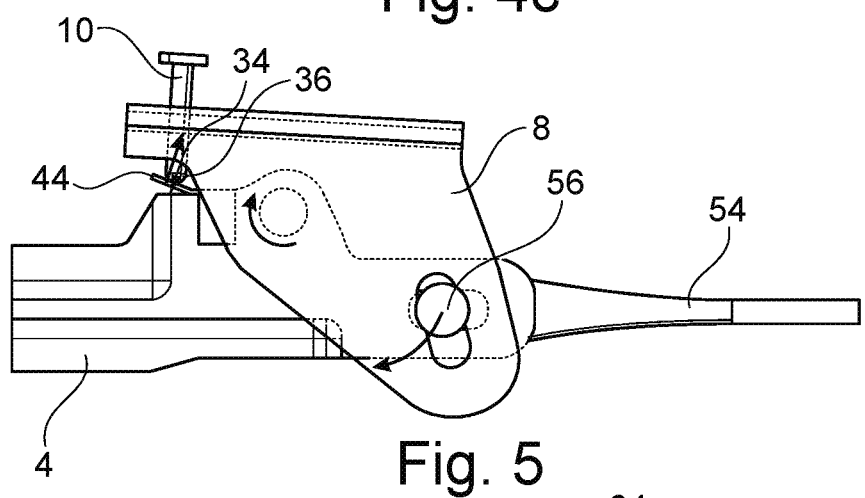
FIG. 5 shows an equalization movement of the tensioning element of the device according to an embodiment of the invention in a deformation of the vehicle.

FIG. 5 demonstrates the equalization of a temporary vehicle deformation in which the tensile element 54 is at least temporarily somewhat too long. On account thereof, the tensioning lever 8 can move in the clockwise manner to a furthermore tensioned position in that the sheet-metal spring 44 pushes the screw end 36 away from the tensioning face 34.

Figure 6A:
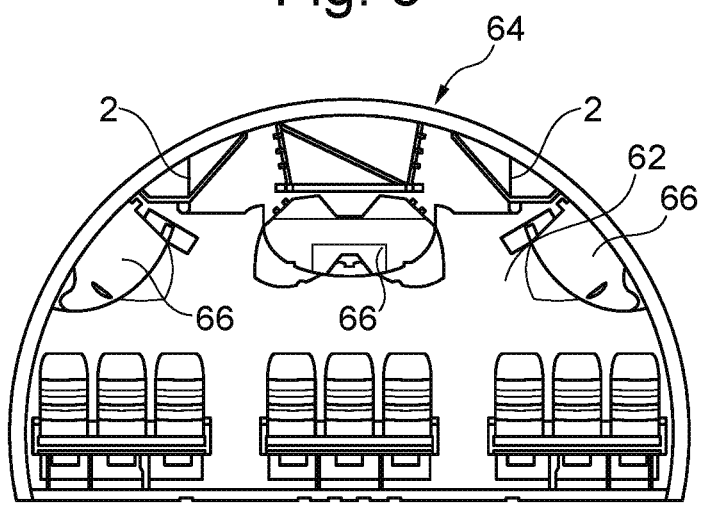
FIGS. 6a and 6b show an installation of installation elements in a cabin, said installation elements being braced in a vehicle.
Figure 6B:
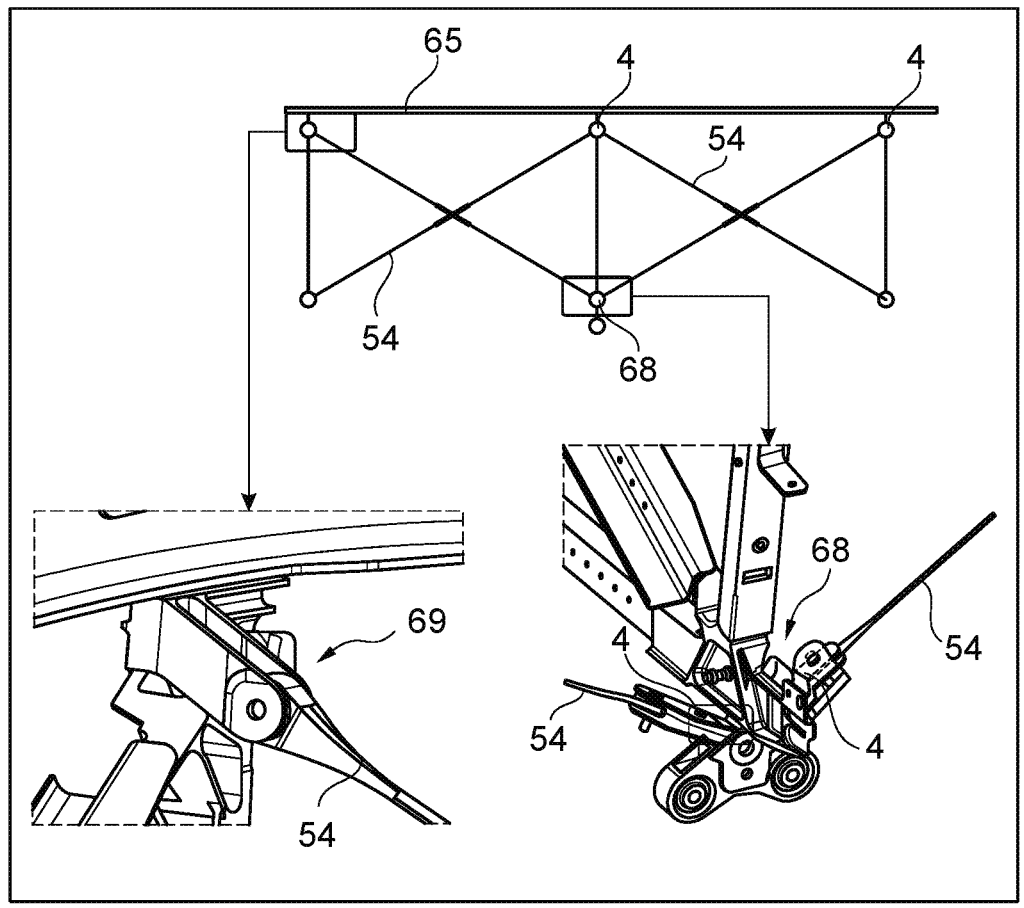

FIGS. 6a and 6b demonstrate a potential use of the tensioning system 2 in a cabin 62 of a vehicle 64 in which a plurality of overhead lockers 66 as installation elements are disposed on a primary structure which is surrounded by a vehicle skin 65. Said overhead lockers 66 are connected to structurally fixed regions by way of tensile elements 54. This will be explained in somewhat more detail in FIG. 6b. The viewing direction in FIG. 6b is identified by the direction arrow which points along the longitudinal axis of the vehicle 64. A plurality of structurally fixed holders 4 here are identified by a circle from which a plurality of tensile elements 54 extend. Here a holding point 68 on which two structurally fixed holders 4 are disposed can be seen in an exemplary manner, said two structurally fixed holders 4 by way of an assembly as shown in the preceding figures holding in each case one tensile element 54. An additional non-adjustable holding point 69 which, for instance, holds another end of a tensile element 54 is shown on the left in the drawing plane.

Figure 7:
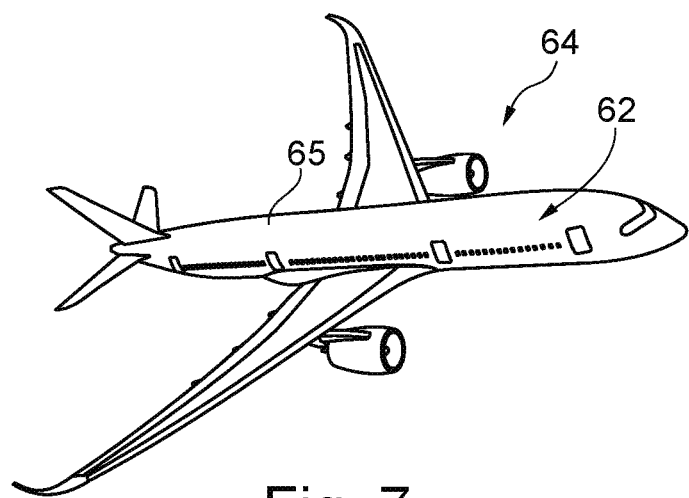
FIG. 7 shows an aircraft having a cabin and installation elements disposed therein.

FIG. 7 shows the vehicle in the form of an aircraft 64 having the cabin 62 disposed therein, said cabin 62 containing a plurality of installation elements.

Figure 8:
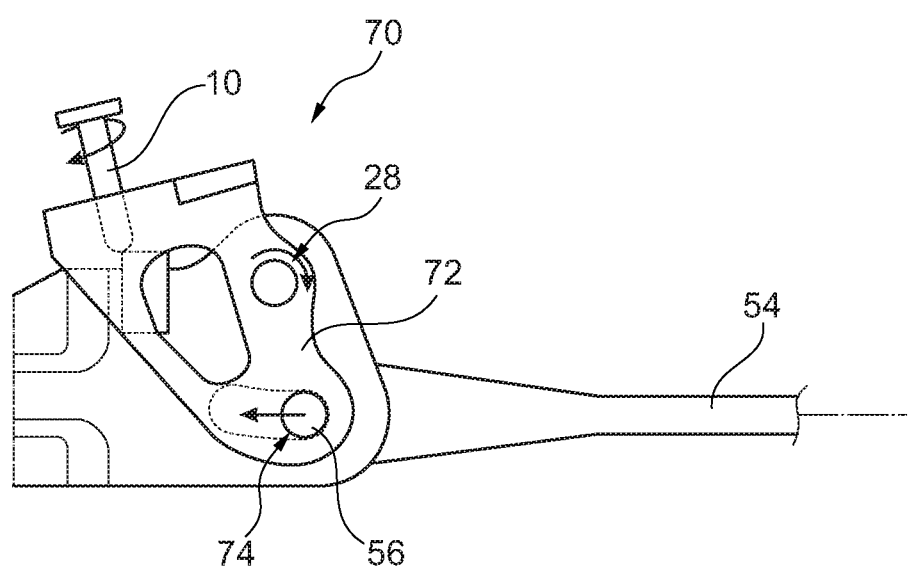
FIG. 8 shows a further exemplary embodiment of a system according to an embodiment of the invention.

Finally, FIG. 8 represents a modified variant in the form of a system 70 for bracing the tensile element 54. A tensioning lever 72 which is very similar to the tensioning lever 8 is used here. The pivot bearing 28 in an exemplary manner is spaced somewhat further apart from the tensioning means 10 than in the preceding exemplary embodiment. Additionally, only conventional bores 74 which have a circular area are used instead of elongate holes 30. Meanwhile, the elongate holes 52 in the structurally fixed holder 4 have a slightly curved profile so as to achieve an adaptation to the positional profile of the bores 74 when pivoting the tensioning lever 72 about the pivot bearing 28. This variant could be somewhat easier to produce than the preceding one but nevertheless offer the same tensioning potential.

It is to be pointed out that the vehicle 64 from FIGS. 6a to 7 is also capable of being equipped with a system 70 according to an embodiment of the invention.

Additionally, it should be noted that "having" does not exclude any other elements or steps and "a" or "an" does not exclude a multiplicity. It should furthermore be noted that features which have been described in the context of one of the above exemplary embodiments can also be used in combination with other features of other exemplary embodiments described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A bracing system for a tensile element in a vehicle, the system comprising:
   an elongate tensile element having a traction eyelet;
   a structurally fixed holder comprising an elongate hole and a tensioning face; and
   a tensioning device comprising an angled tensioning lever, which has a first leg portion and a second leg portion, with a pivot bearing disposed therebetween;
   wherein the structurally fixed holder has a displaceable bearing which, for coupling to the traction eyelet, is displaceable, within the elongate hole formed in the structurally fixed holder, along a first direction;
   wherein the displaceable bearing is held within one or more holes formed in the first leg portion, wherein the one or more holes are displaceable relative to the displaceable bearing along a second direction, which is inclined at an angle relative to the first direction;
   wherein the tensioning lever, by way of the pivot bearing, is coupled to the structurally fixed holder;
   wherein the first leg portion is coupled to the displaceable bearing such that the displaceable bearing, by pivoting the tensioning lever, is displaced in the structurally fixed holder; and
   wherein the second leg portion has a tensioner which, by displacing the displaceable bearing, is configured for setting a variable spacing between the second leg portion and the tensioning face, which faces the second leg portion, of the structurally fixed holder.

2. The system according to claim 1, comprising a spring-elastic element on the tensioning face, wherein the spring-elastic element is configured for pushing the second leg portion in a direction that tensions the tensile element.

3. The system according to claim 2, wherein the spring-elastic element comprises a sheet-metal spring having a resilient portion facing away from the tensioning face and is capable of contacting the tensioner in a planar manner.

4. The system according to claim 2, wherein the tensioning face comprises an optical marking, which is obscured in the event of the spring-elastic element being pushed onto the tensioning face.

5. The system according to claim 1, wherein the tensioning lever is saddle-shaped and has two lateral faces, which are mutually spaced apart and are connected to one another by a bridging portion.

6. The system according to claim 5, wherein the one or more holes formed in the first leg portion are two mutually parallel and opposite elongate holes, which are disposed in the lateral faces to guide the displaceable bearing.

7. The system according to claim 5, wherein the one or more holes formed in the first leg portion are two mutually opposite bores disposed in the lateral faces to guide the displaceable bearing.

8. The system according to claim 1, wherein the first direction, along which the displaceable bearing is displaceable within the elongate hole formed in the structurally fixed holder, is parallel to an axial direction of the tensile element.

9. The system according to claim 1, wherein the pivot bearing extends through at least one pivot bearing bore of the tensioning lever and one bore of the structurally fixed holder.

10. The system according to claim 1, wherein the tensioner comprises a straining screw, which is screwed into a thread of the tensioning lever.

11. The system according to claim 1, wherein the tensile element comprises reinforcement fibers, which form a loop at an end of the tensile element in which the traction eyelet is integrated.

12. A vehicle comprising:
    a cabin,
    at least one installation element disposed in the cabin; and
    a system according to claim 1 coupled to a structure fixed to the vehicle.

13. The vehicle according to claim 12, wherein the vehicle is an aircraft.

14. The vehicle according to claim 12, wherein the at least one installation element comprises an overhead locker.

* * * * *